US008450695B2

(12) United States Patent
Kappler et al.

(10) Patent No.: US 8,450,695 B2
(45) Date of Patent: May 28, 2013

(54) CIRCUIT ARRANGEMENT FOR COUNTING X-RAY RADIATION X-RAY QUANTA BY WAY OF QUANTA-COUNTING DETECTORS, AND ALSO AN APPLICATION-SPECIFIC INTEGRATED CIRCUIT AND AN EMITTER-DETECTOR SYSTEM

(75) Inventors: Steffen Kappler, Effeltrich (DE); Karl Stierstorfer, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 365 days.

(21) Appl. No.: 12/953,539

(22) Filed: Nov. 24, 2010

(65) Prior Publication Data
US 2011/0121191 A1    May 26, 2011

(30) Foreign Application Priority Data
Nov. 26, 2009    (DE) .................. 10 2009 055 807

(51) Int. Cl.
*G01T 1/24* (2006.01)
(52) U.S. Cl.
USPC .............................. 250/370.09; 378/5; 378/19
(58) Field of Classification Search
USPC ....................................................... 250/1–15
See application file for complete search history.

(56) References Cited

U.S. PATENT DOCUMENTS

| | | | |
|---|---|---|---|
| 3,696,399 A | 10/1972 | Klein | |
| 4,306,192 A | 12/1981 | Parker | |
| 5,440,130 A * | 8/1995 | Cox et al. | 250/370.09 |
| 6,583,421 B2 * | 6/2003 | Harvey | 250/397 |
| 7,139,362 B2 * | 11/2006 | Heismann et al. | 378/5 |
| 7,268,354 B2 | 9/2007 | Heismann et al. | |
| 7,417,472 B2 * | 8/2008 | Tumer et al. | 327/70 |
| 8,269,183 B2 * | 9/2012 | Furumiya et al. | 250/370.1 |
| 2005/0098735 A1 * | 5/2005 | Heismann | 250/370.12 |
| 2005/0105687 A1 * | 5/2005 | Heismann et al. | 378/98.8 |
| 2005/0123090 A1 | 6/2005 | Heismann et al. | |
| 2009/0039273 A1 * | 2/2009 | Tkaczyk et al. | 250/370.06 |
| 2009/0304149 A1 * | 12/2009 | Herrmann et al. | 378/62 |
| 2010/0207027 A1 | 8/2010 | Marks et al. | |
| 2010/0215230 A1 * | 8/2010 | Bornefalk et al. | 382/128 |
| 2010/0294944 A1 * | 11/2010 | Furumiya et al. | 250/370.1 |
| 2011/0168909 A1 * | 7/2011 | Nakao et al. | 250/370.09 |

FOREIGN PATENT DOCUMENTS

| | | |
|---|---|---|
| DE | 10357187 A1 | 6/2005 |
| JP | 55166065 A | 12/1980 |
| WO | WO 2009050619 A2 | 4/2009 |
| WO | WO 2009054070 A1 * | 4/2009 |

* cited by examiner

*Primary Examiner* — David Porta
*Assistant Examiner* — Taeho Jo
(74) *Attorney, Agent, or Firm* — Harness, Dickey & Pierce, P.L.C.

(57) ABSTRACT

In at least one embodiment, a circuit arrangement of a quanta-counting detector with a multiplicity of detector elements is disclosed, wherein the X-ray quanta registered in each detector element generate a signal profile. In at least one embodiment, the circuit arrangement, in each detector element, includes: at least one first comparator with a first energy threshold lying in the energy range of the measured X-ray quanta and at least one second comparator with a second energy threshold lying above the energy range of the measured X-ray quanta, the at least one first and second comparators being connected to the detector element. Further, the at least two comparators have a logical interconnection, wherein at least a first comparator and a second comparator are connected to the inputs of an XOR gate, and each XOR gate connected to a first comparator is connected to precisely one edge-sensitive counter.

19 Claims, 7 Drawing Sheets

CIRCUIT ARRANGEMENT FOR COUNTING X-RAY RADIATION X-RAY QUANTA BY WAY OF QUANTA-COUNTING DETECTORS, AND ALSO AN APPLICATION-SPECIFIC INTEGRATED CIRCUIT AND AN EMITTER-DETECTOR SYSTEM

PRIORITY STATEMENT

The present application hereby claims priority under 35 U.S.C. §119 on German patent application number DE 10 2009 055 807.1 filed Nov. 26, 2009, the entire contents of which are hereby incorporated herein by reference.

1. Field

At least one embodiment of the invention generally relates to a circuit arrangement for counting X-ray radiation X-ray quanta in detector elements in a detector in an emitter-detector system of an X-ray CT system. In at least one embodiment, it relates to an X-ray radiation including a multiplicity of X-ray quanta that can have a maximum energy, and where the X-ray quanta registered in each detector element generate a signal profile with X-ray-quanta-energy-dependent voltage pulses with different heights, which may be superposed on one another. In at least one embodiment, it also generally relates to an application-specific integrated circuit and/or an emitter-detector system.

2. Background

Conventional X-ray systems are well-known. By way of example, they are used in medicine for X-ray examinations of patients. In the process, depending on the body region to be examined or the tissue to be examined, different X-ray radiation energies are required in order to penetrate the tissues with different densities, such as fatty tissue or bones. Here the acceleration voltage at which the X-ray tube used for generating the radiation is operated is decisive for the energy of the X-ray radiation. A different tube voltage can be selected depending on the desired image information. Much radiation is absorbed by the tissue at low energies, and this visualizes even fine tissue differences on the X-ray film. By contrast, high-energy radiation penetrates tissue and materials significantly more easily and contrast differences are much softer.

In conventional installations, the object to be imaged is irradiated by an X-ray source and imaged on an X-ray film or a detector. A projection of the volume is created on a surface. Information relating to the third dimension of the irradiated body is lost for the most part in this projection.

X-ray computed tomography systems are a development of the X-ray systems. An X-ray CT system can generate many X-ray images of the object from different directions, and the volume information can be subsequently reconstructed from these many images. These 3D reconstructions are generally composed of individual slices that run perpendicularly through the object. This allows a density to be established for each volume element in the object.

Since a multiplicity of X-ray recordings are performed within a short space of time in computed tomography, special detectors are required that can feed the X-ray images directly to a data processing unit in digital form. Electronic detectors are usually utilized for this purpose. These detectors usually comprise individual detector elements arranged like pixels in order to obtain a spatial resolution of the X-ray image.

Previously integrating detectors were mainly used in computed tomography, in which detectors the incident X-ray radiation is detected indirectly via the excitation of electrons and the conversion into photons.

The use of quanta-counting detectors offers a further option for detecting X-ray radiation. In principle, these allow energy-specific registering of the X-ray quanta, and so an increase in the contrast display can be achieved. Furthermore, this offers the option of using multi-spectral methods, which allow, inter alia, an assessment of the density of the penetrated tissue, i.e. differentiation between different materials.

When an X-ray quantum is incident on such a counting detector, a voltage pulse is generated that has a pulse height characteristic of the X-ray-quantum energy. The pulses can then be registered in a connected data processing device by a count circuit (trigger circuit) for counting the incident X-ray quanta. By arranging the detector elements in a pixel-like fashion, this in principle allows each individual incident X-ray quantum to be resolved in terms of space and energy.

A simple method for this resides in prescribing an energy threshold, wherein a count signal is output as a result of a pulse exceeding this energy threshold. This corresponds to an individual-pulse count (individual-pulse trigger). In order to undertake conventional imaging, this energy threshold is selected such that it for example lies in the range between 15 keV and 35 keV, i.e. below the maximum X-ray-quantum energy. In the case of dual-energy imaging, a further threshold is provided, for example in the range between 50 keV and 80 keV.

However, very high count rates can result from the multiplicity of X-ray quanta incident on the detector per unit time, i.e. a high quantum flux or a high photon flux rate, simply referred to as flux rate below, and individual pulses can increasingly superpose as the flux rate increases. Here one of the critical points is the finite pulse duration of the signals incident on the detector, the duration being approximately 10 ns (FWHM) in typical direct conversion detectors made of CdTe or CdZnTe, for example. In conjunction with necessary electronic pulse forming, this results in effective pulse lengths of the order of approximately 30 ns, which are ideally registered individually.

In the case of pulses that are incident at regular intervals, this alone would limit the maximum measurable X-ray-quantum flux to approximately 33 MHz per pixel, corresponding to a maximum flux of approximately 825 MHz/mm$^2$ in the case of realistic pixel sizes with edge lengths of, for example, approximately 200 µm. However, since the temporal incidence of the pulses is in actual fact distributed according to Poisson statistics, the probability of pulses at least partly superposing with one or more additional pulses in the case of on average 33 million X-ray quanta per pixel and second is already above 60%. In the case of the maximum flux rates of approximately 2 GHz/mm$^2$ currently occurring in computed tomography, this probability even rises to over 90%.

The implication of this is that despite using e.g. shape filters in the beam path, detector elements receiving X-ray radiation subject to little or even no absorption can no longer resolve individual pulses because the pulses of the incident X-ray quanta may even superpose a number of times.

In the case of such a multiple superposition the pulse height then no longer drops below the height of the prescribed energy threshold of the count circuit after every generated pulse. As a result, fewer and fewer count signals are triggered, and so the measured count rate no longer grows linearly with the actual flux rate; this is referred to as the onset of detector paralysis. At even higher flux rates, the pulse height drops even less frequently below the height of the prescribed energy thresholds of the count circuit because the pulse height continuously increases further as a result of superposing pulses. The count circuit then no longer triggers a signal and the measured count rate drops and can even tend to zero. Thus, there may be complete detector paralysis at very high flux rates.

This paralysis means that the relationship between actual flux rate and detected count rate is no longer linear. The measured count rate only corresponds to a fraction of the actual flux rate. In computed tomography, this effect occurs mainly in the edge regions of the objects to be observed or in the air surrounding the objects, where there is only very little or no attenuation of the X-ray radiation. The data from these regions then is no longer proportional to the flux rate and therefore leads to undesired artifacts in the subsequent image reconstruction, and in the worst case this data cannot be used.

SUMMARY

In at least one embodiment of the invention, a circuit arrangement for an X-ray detector is described for measuring X-ray radiation X-ray quanta, which circuit arrangement ensures that the detector has a very broad dynamic range, i.e. it is a detector that measures flux rates very precisely, and possibly even with energy resolution, at low flux rates but at the same time exhibits no paralysis even at high flux rates, and thus allows high-quality imaging.

Advantageous developments of the invention are the subject matter of the dependent claims.

In general, the pulse heights can be added directly when pulses superpose (pile up). A superposition of two individual pulses would thus result in a pulse that at most has double the height of the maximum X-ray-quantum energy. In order to be able also to measure higher pulses reliably, an additional higher energy threshold is then required for the utilized pile-up count. In order to ensure that the energy threshold provided for e.g. a superposition really only registers superposed pulses, the energy threshold can be prescribed such that it is higher than the maximum X-ray-quantum energy. Such an energy threshold is not attained by an individual X-ray quantum and a corresponding count-circuit arrangement hence only registers pulses that have at least been superposed. By prescribing further, even higher energy thresholds multiply superposed pulses can also be counted in a corresponding fashion.

A disadvantage of the pile-up count is that there is no energy discrimination of the X-ray quanta above the maximum X-ray-quantum energy. Hence it is mainly suitable for edge regions of the examination object or for air, where high quantum fluxes have to be processed. Energy discrimination of the X-ray quanta is not important here because these regions are rather uninteresting.

The inventors have discovered that a very broad dynamic range of a detector can be created by a logical interconnection of energy-threshold-dependent detector signals as a result of logically connecting raw detector signals, i.e. voltage or current pulses from the detector elements, from the energy range of the measured X-ray radiation and raw detector signals above this energy range and setting the energy thresholds used in the process such that detector paralysis does not occur or only occurs at significantly higher quantum fluxes.

Accordingly, pile-up counts with additional energy thresholds can be combined with the conventional individual-pulse count. For this purpose, a plurality of further energy thresholds, but at least one further energy threshold, can be prescribed that lie in the range between the minimum and the maximum X-ray-quantum energy, and so only individual, non-superposed pulses are normally registered thereby and these pulses are counted in an energy-specific fashion.

Hence, the complexity of a system based on pile-up counters can be simplified by combining the individual-pulse counters, used in conventional imaging, with the pile-up counters. This can be brought about by electronically connecting the comparators, i.e. the pre-stages of the counter components, such that the signals from the individual-pulse thresholds are counted in the case of non-superposing individual pulses and the signals from the pile-up thresholds are counted in the case of superposing pulses. In the following text, such counters according to the invention are referred to as piggyback counters.

In the simplest case, i.e. in the case of a piggyback counter with only a first energy threshold and a pile-up threshold, this connection is an XOR gate (XOR=exclusive or), which only transmits the signal from the pile-up threshold to an edge-sensitive counter and ignores the signal from the individual-pulse threshold.

Since, in principle, not only two but also a plurality of energy thresholds are possible in the design of a piggyback counter, the connection may also have a more complex implementation and contain e.g. time-delay and/or dead-time circuits.

However, what is decisive in all combination and connection options between individual-pulse and pile-up thresholds is that, firstly, each XOR gate, connected to an individual-pulse threshold, for registering the X-ray quanta in an energy-specific fashion is connected to precisely one counter and, secondly, the signals are logically interconnected before the signals are fed to a counter.

An example for this is a combination of one individual-pulse threshold and two pile-up thresholds. Here, it is expedient firstly to connect an XOR gate between the individual-pulse threshold and the lower pile-up threshold and subsequently to connect the output signal from the XOR gate and the signal from the second pile-up threshold, or the further pile-up thresholds, by OR gates.

In the case of two individual-pulse thresholds and one pile-up threshold, the pile-up threshold can in each case be connected to the two individual-pulse thresholds by an XOR gate, wherein the XOR gates can respectively be connected to a counter.

There is a further connection option in the last-mentioned case. There may be e.g. a time-delay circuit or a dead-time circuit between the at least two individual-pulse thresholds and their XOR gates. The signals from the XOR gates then are once again fed to two counters, wherein the signal from the first counter, which belongs to the lower individual-pulse threshold, can also be blocked by the signal of the second counter, which belongs to the higher individual-pulse threshold, by way of a veto circuit. This allows energy-range-selective detection in the range of the X-ray radiation energy.

Overall, therefore, the logical interconnection of the signals leads to the individual-pulse count being present at low flux rates and the pile-up count being present in the case of high flux rates. The fact that the relationship between actual flux rate and measured count rate is no longer linear, but transitions into strong saturation or paralysis, in the individual-pulse counter above a certain flux rate can thus be compensated for by using a pile-up count above a certain flux rate. By avoiding detector paralysis, an unambiguous assignment between measured count rate and actual flux rate is maintained over a very broad dynamic range, which may be further extended by further pile-up thresholds. The use of a lookup table or a mathematical function relating to previously determined relationships between actual flux rate and measured count rate allows a flux-rate correction to be obtained without problems over a broad dynamic range.

A particularly advantageous property of such circuits is the fact that the transition region between individual-pulse count and pile-up count is very smooth.

According to this basic idea, the inventors, in at least one embodiment, propose to improve a circuit arrangement for counting X-ray radiation X-ray quanta in detector elements in a detector in an emitter-detector system of an X-ray CT system, wherein the X-ray radiation includes a multiplicity of X-ray quanta that can have a maximum energy, and the X-ray quanta registered in each detector element generate a signal profile with X-ray-quanta-energy-dependent voltage pulses with different heights, which may be superposed on one another, to the extent that there is the following circuit arrangement in each detector element:

at least one first comparator with a first energy threshold, corresponding to an individual-pulse threshold, less than or equal to the maximum X-ray-quantum energy and at least one second comparator with a second energy threshold, corresponding to a pile-up threshold, greater than the maximum X-ray-quantum energy are connected to the detector element, wherein the at least two comparators respectively generate a comparator output signal if their respective energy threshold is exceeded, the at least two comparators have a logical interconnection, wherein at least a first comparator and a second comparator are connected to the inputs of an XOR gate, and each XOR gate connected to a first comparator is connected to precisely one counter.

An advantageous embodiment of the circuit arrangement according to the invention provides for at least two first comparators with different first energy thresholds to be connected to the detector element and for there to be an XOR gate for each first comparator. According to at least one embodiment of the invention, each XOR gate connected to a comparator is furthermore connected to a counter such that, at least at low flux rates, a functioning energy-range-selective detection of X-ray quanta is possible. By way of example, a detector with such a circuit arrangement can be used for multi-energy measurement in computed tomography using a single X-ray spectrum.

Furthermore, it is advantageous for there to be a time-delay circuit or a dead-time circuit between a first comparator and the XOR gate thereof, which circuits can influence the transmission of the comparator output signals. The effect of this is that the comparator signals from the spectral thresholds, slightly offset in time, are incident in the correct sequence and that the trigger duration of the comparator signals from both thresholds can be adapted in an optimal fashion with the following object. (In the case of a typical high-energy individual pulse both leading and trailing edges of the spectral comparator signals should be superposed to the best possible extent.)

In another advantageous embodiment of the circuit arrangement according to the invention, at least one output of an XOR gate connected to a first comparator for a lower energy threshold can have a veto circuit, which, when triggered by the output from another first comparator with a higher first energy threshold, blocks the input of the counter of the first comparator with the lower energy threshold. This prevents the X-ray quanta triggering a number of first comparators from being counted more than once.

At least two second comparators with different second energy thresholds can advantageously be connected to the detector element, wherein the second comparator with the lowest energy threshold and the at least one first comparator are connected to a respective XOR gate, and there is an OR gate for each further second comparator.

A skillful selection of the energy thresholds used for the pile-up count allows the transition region between low and high X-ray-quantum flux rate to be set in an advantageous fashion. Hence a piggyback counter is set to the optimal energy threshold of the individual-pulse count for imaging, but can nevertheless be linearized in an outstanding fashion, even at very high flux rates. This significantly simplifies both the system calibration and the image reconstruction.

There can be a rate correction adjustment in order to correct the finally measured count rates of the X-ray quanta to the actual flux rate of the X-ray quanta. This can be brought about by a separate circuit or by software in the detector-signal processing or correction within the computational system. For this purpose, use can for example be made of a lookup table or an emulation of a mathematical function, for example with the aid of a polynomial.

The circuit arrangement according to at least one embodiment of the invention can advantageously be part of an application-specific integrated circuit (ASIC) on a detector.

At least one embodiment of the invention also relates to an application-specific integrated circuit for use in an edge-sensitive, quanta-counting detector in an emitter-detector system of a CT system with a multiplicity of detector elements, wherein this application-specific integrated circuit (ASIC) has at least one circuit arrangement according to at least one embodiment of the invention for each detector element. This ASIC can advantageously be connected to a plurality of detector elements or support the latter.

At least one embodiment of the invention moreover also relates to an emitter-detector system of an X-ray CT system with at least one of the above-described circuit arrangements according to at least one embodiment of the invention.

BRIEF DESCRIPTION OF THE DRAWINGS

In the following text, the invention will be described in more detail on the basis of example embodiments with the aid of the figures, with reference being made to the fact that only the elements essential for the direct understanding of the invention are shown.

The following reference signs are used in this case: 1: voltage pulse; 1$x$: x-th superposed voltage pulse; 2: signal from a first energy threshold; 3: signal from a third energy threshold; 4: X-ray spectrum; 11-15: profile between measured count rate and actual flow rate of the X-ray quanta; 16: voltage-pulse profile; 17.1: count-signal profile of the first counter; 17.2: count-signal profile of the second counter; ASIC: application-specific integrated circuit; C1: X-ray CT system; C2: first X-ray tube; C3: first detector; C4: second X-ray tube; C5: second detector; C6: gantry housing; C7: patient; C8: displaceable patient couch; C9: system axis; C10: control and computational unit; D: detector; del: time-delay circuit; $E_{min}$: minimum X-ray-quantum energy; $E_{max}$: maximum X-ray-quantum energy; $E_x$: x-th energy-threshold energy; $EP_x$: x-th voltage-pulse energy; $\dot{F}_{tat}$: actual X-ray-quantum flux rate; h: voltage-pulse height; $h(E_x)$: height of the x-th energy threshold; I: intensity; $K_x$: comparator; OR: OR gate; $Prg_1$-$Prg_n$: computer programs or program modules; tot: dead-time circuit; t: time; veto: veto circuit; XOR: XOR gate; $Z_1$, $Z_2$: counters; $\dot{Z}_{gem}$: measured X-ray-quantum count rate.

In detail.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words, used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Figure 1:
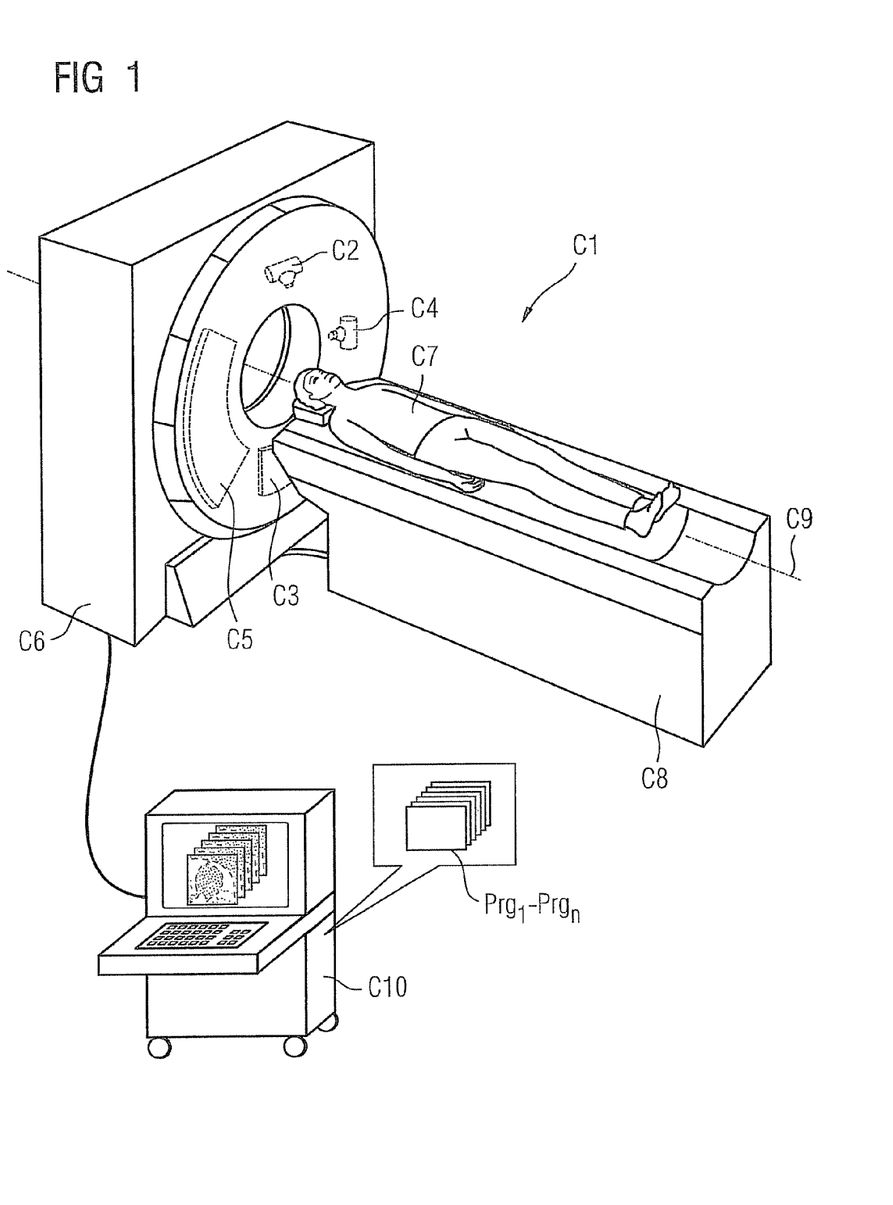
FIG. 1 shows a schematic illustration of an X-ray CT system with an emitter-detector system.

FIG. 1 shows an example CT system C1 in a 3D illustration. The CT system C1 includes a gantry housing C6, within which there is a gantry (not illustrated in any more detail here) on which a first X-ray tube C2 is attached with an opposing first detector C3 according to an embodiment of the invention. Provision is optionally also made for a second X-ray tube C4 with an opposing second detector C5 according to an embodiment of the invention. A patient C7 is on a patient couch C8, which can be displaced along the direction of the system axis C9 and along with which the patient can be pushed in a continuous or sequential fashion along the system axis C9 and through a measurement field between the X-ray tube C2 and the opposing detector C3 during the scan. This process is controlled by a control and computational unit C10 with the aid of computer programs $Prg_1$-$Prg_n$.

The control and computational unit C10 is connected to at least one counter of the circuit arrangement according to an embodiment of the invention, which is part of an application-specific integrated circuit, which is associated with at least one detector element.

Figure 2:
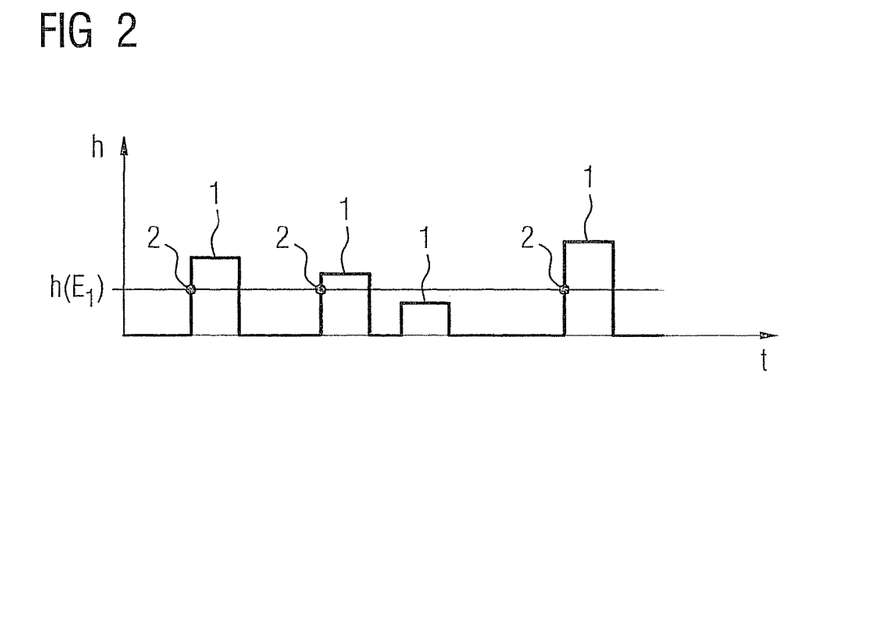
FIG. 2 shows a schematic illustration of the individual-pulse count.

FIG. 2 shows a schematic illustration of a plurality of voltage pulses with individual-pulse count. Here, the axes of this diagram are labeled by the pulse height h (ordinate) and the time t (abscissa). When an X-ray quantum is incident on a detector element, the former generates a voltage pulse 1 with a characteristic pulse height h corresponding to its energy. Four voltage pulses 1 that are not superposed, but have different heights and intervals, are plotted in this example. The X-ray-quantum flux rate on the detector is correspondingly low.

A signal 2 is generated each time the pulse heights h exceeds a prescribed energy threshold $E_1$. The pulse height h of the third pulse 1 from the left is too low and thus it does not generate a signal. The energy threshold $E_1$ at the height $h(E_1)$ is not exceeded between the pulses 1. Here the pulses 1 are clearly separated from one another. The generated signals 2 are used as count signals in a data processing unit associated with the X-ray system, as a result of which the X-ray quanta incident on the detector are counted and imaging becomes possible. In the process, imaging based on counting individual quanta—individual-pulse count—already offers a significantly improved quality than in the case of merely observing the incidence of energy on a detector.

Figure 3:
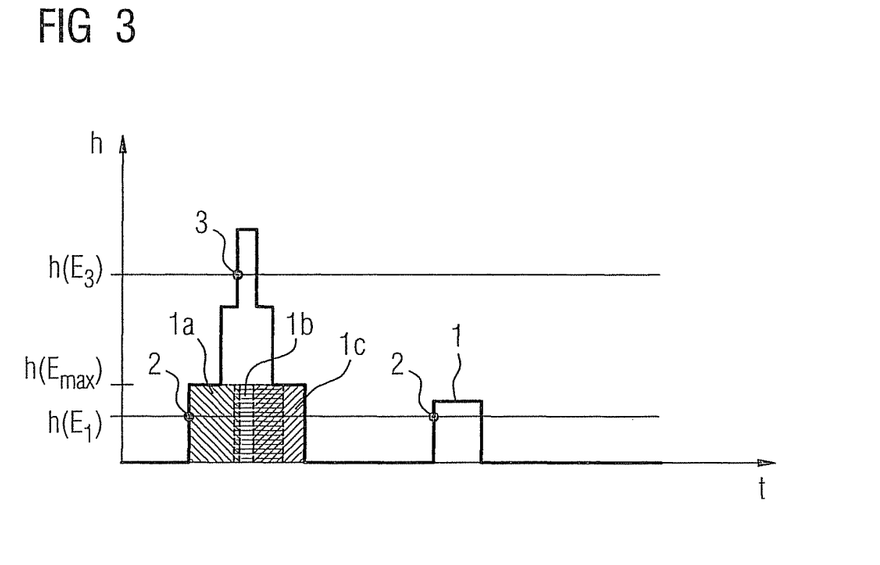
FIG. 3 shows a schematic illustration of the pile-up count.

The counting of individual X-ray quanta becomes problematic as soon as a plurality of voltage pulses 1 superpose as a result of X-ray quanta impinging on the detector in rapid succession and said pulses can then no longer be separated from one another in time. Such a high flux rate is illustrated in FIG. 3. A pulse generated by the superposition of three individual pulses $1a$, $1b$ and $1c$ is illustrated in the left-hand part. The respective pulses $1a$, $1b$ and $1c$ are characterized by shading. The pulse heights of the three individual pulses $1a$, $1b$ and $1c$ can simply be added.

However, the energy threshold $E_1$ is only exceeded a single time despite the superposition, and so only a single signal 2 is triggered despite there being three incident X-ray quanta. This results in a count rate that is too low with respect to the actual irradiated flux rate. In the case of a plurality of superpositions and a correspondingly low count rate, the registered data may no longer be suitable for imaging.

In order nevertheless to be able to count the three successive voltage pulses $1a$, $1b$ and $1c$, a further energy threshold $E_3$ at a height $h(E_3)$ is provided in addition to the energy threshold $E_1$ at a height $h(E_1)$, the former threshold lying higher than the maximum X-ray-quantum energy $E_{max}$, and thus lying higher than the maximum height $h(E_{max})$ of an individual electrical pulse 1. The superposed pulse exceeds this energy threshold $E_3$ and thus triggers a further signal 3. This is the pile-up count.

This allows the number of detected X-ray quanta to approach the number of actually incident X-ray quanta, and so the relationship between actual flux rate and measured count rate again becomes approximately linear. This ensures reliable counting of even a plurality of superposing voltage pulses $1a$, $1b$ and $1c$, as a result of which this data can likewise be used meaningfully for imaging. This allows imaging that is of higher quality and better overall. However, the counters in the pile-up range do not distinguish between the energies of the registered pulses.

According to an embodiment of the invention, in order to obtain an approximately linear relationship between actual quantum flux and detected quantum flux over a very broad range of the flux rate, i.e. from low to high fluxes, the individual-pulse count can be combined with the pile-up count and so the individual-pulse count dominates in regions with a low flux and the pile-up count dominates in regions with a high flux. Occasionally pulses with small heights may also superpose at low quantum fluxes; these are not registered by a pile-up threshold and slightly falsify the measurement result.

Figure 4:
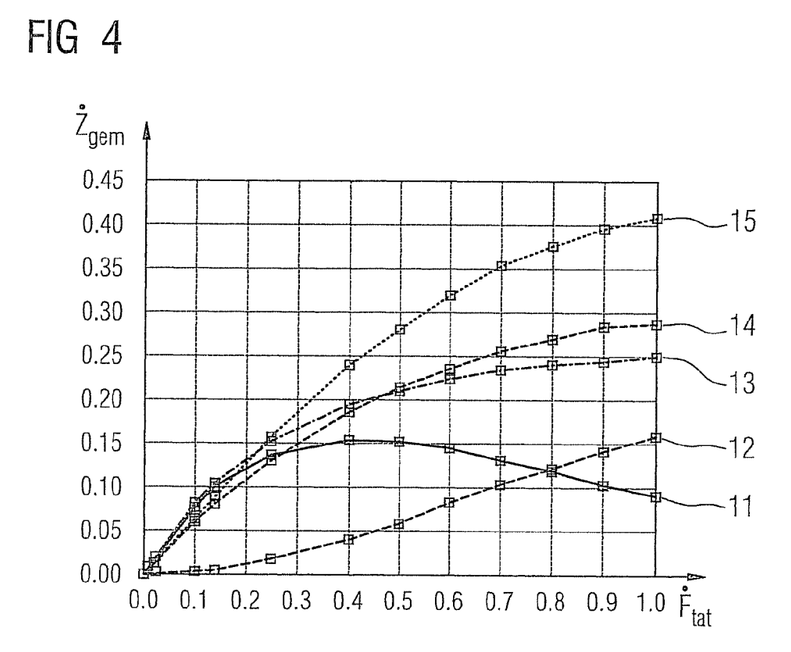
FIG. 4 shows a schematic illustration of the relationship between measured X-ray-quantum count rate and actual X-ray-quantum flux rate for a number of examples.

FIG. 4 shows a graph of different relationships between measured count rate $\dot{Z}_{gem}$ and actual flux rate $\dot{F}_{tat}$ of the X-ray quanta. The profile 11 of an individual-pulse counter, of a pure pile-up counter 12 and the profiles 13, 14 and 15 of different counter combinations, the piggyback counters, can be identified. The energy thresholds of the pile-up counters lie above the maximum X-ray-quantum energies and can only be exceeded by the superposition of a plurality of electrical pulses.

The profile 11 of the individual-pulse counter is only linear over a small initial region and then very quickly transitions to saturation. In the case of flux rates $\dot{F}_{tat}$ at which a plurality of pulses superpose and it follows that there is a significant increase in the pulse heights, the energy thresholds are exceeded for an ever increasing amount of time and no more signals are triggered. As a result, the measured flux rate $\dot{Z}_{gem}$ reaches a maximum (onset of paralysis) and even drops off again thereafter (complete paralysis) because the pulse height is virtually permanently above the corresponding energy thresholds and almost no more signals are triggered.

The profile 12 of the pile-up counter still is very flat in the initial region, i.e. in the case of very low quantum fluxes. The reason for this is that individual pulses are not registered. The measured count rate $\dot{Z}_{gem}$ of this profile 12 is therefore below the actual flux rate $\dot{F}_{tat}$ of the profile 11 of the individual-pulse counter. However, the linear region of the pile-up counter already reaches significantly higher flux rates than that of the individual-pulse counter. As a result of the additional introduction of higher energy thresholds, paralysis, at which no more signals are generated, occurs only at much higher flux rates.

A skillful logical interconnection of the individual-pulse and pile-up counters allows the generation of a measured count rate $\dot{Z}_{gem}$ that is linear with respect to the actual flux rate $\dot{F}_{tat}$ over a relatively broad region, more particularly also in regions in which the counters with energy thresholds below the maximum X-ray-quantum energy no longer provide useable data. This can ensure substantially better imaging by the X-ray system. The profiles 13, 14 and 15 of the piggyback counters exhibit a sufficiently linear shape over broad regions without transitioning into paralysis.

The flux rate can be corrected by the profiles shown here of the relationships between the measured count rates $\dot{Z}_{gem}$ and the actual flux rates $\dot{F}_{tat}$. By way of example, a lookup table or a mathematical function can be generated, by means of which measured count rates are transferred or converted into actual flux rates.

Figure 5:
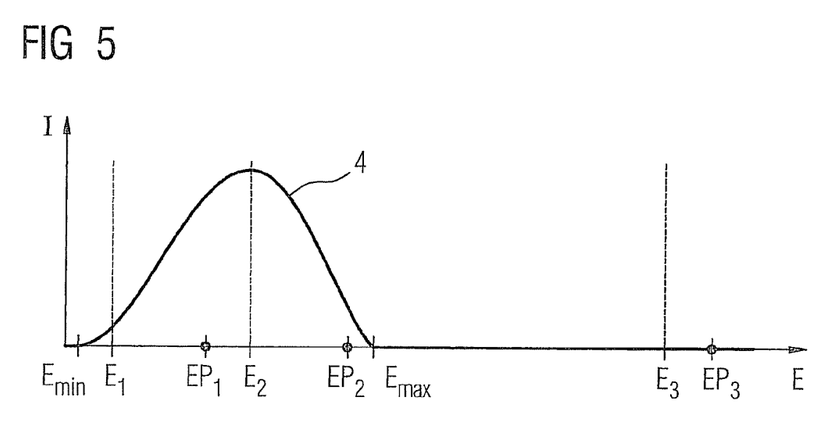
FIG. 5 shows a schematic illustration of an X-ray spectrum with a plurality of prescribed energy thresholds.

The logical interconnection according to an embodiment of the invention of the comparators or the energy thresholds is illustrated in the diagram of FIG. 5. Here, the intensity I (ordinate) of the X-ray radiation is plotted against the energy E (abscissa). The X-ray spectrum 4 selected in an example fashion extends from a minimum energy $E_{min}$ to a maximum energy $E_{max}$. Furthermore, three different energy thresholds $E_1$, $E_2$ and $E_3$ are plotted along the abscissa, with the energy thresholds $E_1$ and $E_2$ being located in the region between the minimum and maximum energy $E_{min}$ and $E_{max}$. The energy threshold $E_3$ is double the maximum energy $E_{max}$, and so it can only be exceeded by superposed pulses. It corresponds to a pile-up counter.

Moreover, the energies $EP_1$, $EP_2$ and $EP_3$ from three different pulses are also plotted on the abscissa, with the energy $EP_3$ corresponding to a superposition of individual pulses. The first pulse (energy $EP_1$) is between the energy thresholds $E_1$ and $E_2$ and thus only triggers a signal at the first energy threshold $E_1$. The second pulse (energy $EP_2$) exceeds the first and the second energy threshold $E_1$ and $E_2$ and thus triggers a signal at each energy threshold, i.e. at both individual-pulse counters. However, the logical interconnection of these comparators causes only the signal of the individual-pulse counter with the higher energy threshold $E_2$ to be counted and the other signal to be ignored.

The lower energy thresholds $E_1$ and $E_2$ were selected such that the first energy threshold $E_1$ registers those X-ray quanta whose energy is in the lower half of the spectrum and the second energy threshold $E_2$ registers those X-ray quanta whose energy is in the upper half of the spectrum. A substantially improved energy resolution can be obtained in this fashion.

As long as there is a low X-ray-quantum flux, all pulses are registered by the individual-pulse counters. However, if the flux increases and there are superpositions, the lower energy thresholds are continuously exceeded and this results in saturation. The next-higher energy threshold $E_3$ can only be exceeded, such that a signal is triggered, by a superposed pulse, for example by the pulse at the energy $EP_3$. The signals from the lower energy thresholds are ignored in this case. This is a pile-up counter, which reliably registers the pulses up to substantially higher regions of the flux rate due to the substantially higher energy threshold $E_3$ and does not reach saturation. Optionally a further pile-up counter with a further, even higher energy threshold may also be prescribed.

FIGS. 6, 8, 10 and 12 respectively show a block diagram of different example combination options for forming piggyback counters from individual-pulse and pile-up comparators. The circuit arrangements illustrated here are respectively located on an application-specific integrated circuit ASIC, which has at least one detector element d(m,n) of a quantum-counting detector D. Each circuit arrangement has at least one counter $Z_1$, $Z_2$, which measures the comparator output signals and transmits the measured count rate to a control and computational unit C10.

FIGS. 7, 9, 11 and 13 show the same voltage-pulse profiles 16, respectively belonging to the preceding FIGS. 6, 8, 10 and 12, with the first energy thresholds $E_1$ and $E_2$ and the second energy thresholds $E_3$ and $E_4$, including the count-signal profiles 17.1, 17.2 in each case resulting from the circuit arrangements. Herein, the X-ray-quantum energy of the X-ray radiation is respectively plotted in terms of an energy equivalent E*const [keV] on the ordinate against time t on the abscissa. The voltage-pulse profile has a total of five maxima, with the first two maxima being generated by individual pulses and the latter three maxima being generated by the superposition of a plurality of voltage pulses. The X-ray quantum maximum energy in the utilized X-ray radiation is approximately 120 keV in this case.

The circuit arrangements in FIGS. 10 and 12 each have two first comparators $K_1$ and $K_2$, the energy thresholds $E_1$ and $E_2$ thereof lying below the maximum X-ray-quantum energy. In order to allow energy-specific counting of the X-ray quanta, each first comparator $K_1$ and $K_2$ is associated with its own counter $Z_1$ and $Z_2$. Accordingly, the associated FIGS. 11 and 13 show two count-signal profiles 17.1 and 17.2.

Figure 6:
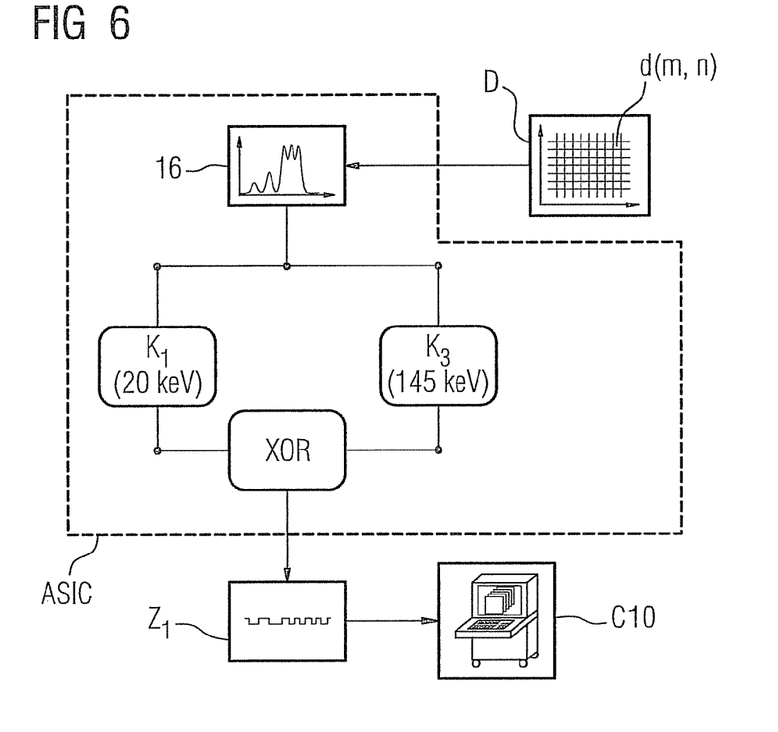
FIG. 6 shows a block diagram of a first example embodiment of a piggyback counter.
Figure 7:
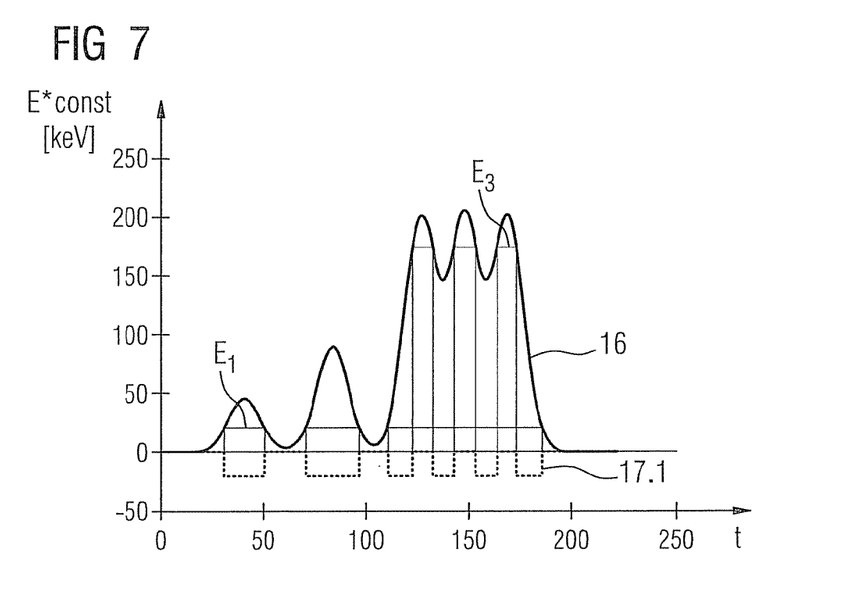
FIG. 7 shows a voltage-pulse profile as per FIG. 6.

FIG. 6 shows a first example embodiment of a block diagram of a simple piggyback counter. The latter includes a first comparator $K_1$ with an individual-pulse threshold $E_1$ at 20 keV, i.e. below the maximum X-ray-quantum energy, and a further second comparator $K_3$ with a pile-up threshold $E_3$ at 145 keV, i.e. above the maximum X-ray-quantum energy. The two comparators $K_1$ and $K_3$ have a logical interconnection by means of an XOR gate and are connected to a counter $Z_1$ downstream thereof. In the case of saturation, i.e. if the lower comparator $K_1$ is triggered continuously, the effect of the XOR gate ("exclusive or") now is that the comparator output signal from $K_1$ is ignored and only the comparator output signal from $K_3$ is counted. The associated count-signal profile 17.1 according to the logical interconnection XOR($K_1$,$K_3$) is illustrated in FIG. 7 situated therebelow.

Figure 8:
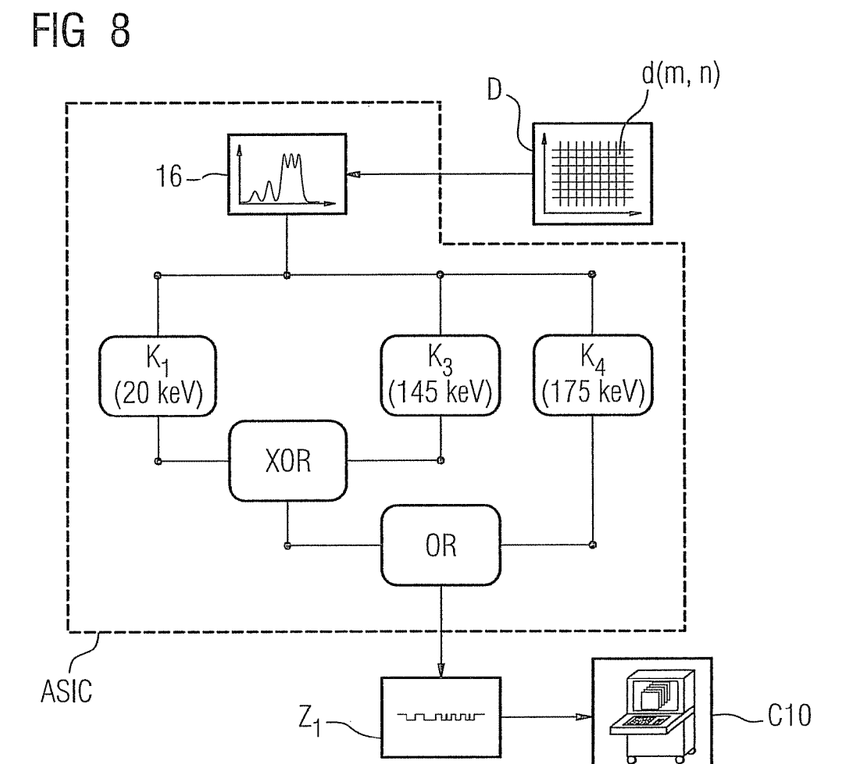
FIG. 8 shows a block diagram of a second example embodiment of a piggyback counter.
Figure 9:
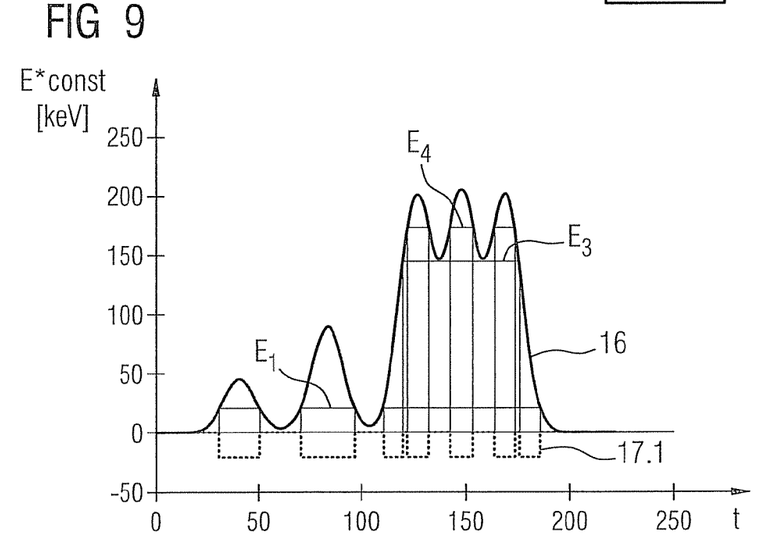
FIG. 9 shows a voltage-pulse profile as per FIG. 8.

FIGS. 8 and 9 describe a second example embodiment. FIG. 8 shows a block diagram in which a first comparator $K_1$ with an individual-pulse threshold at 20 keV is combined with two further comparators $K_3$ and $K_4$ with pile-up thresholds at 145 keV and 175 keV, i.e. above the maximum energy that can be obtained by an X-ray quantum, in order to form a piggyback counter. The comparator $K_3$ with the lower pile-up threshold at 145 keV is connected to the comparator $K_1$ with the individual-pulse threshold via an XOR gate. Furthermore, there is a connection between the XOR gate and the comparator $K_4$ with the higher pile-up threshold via an OR gate ("or"). The output signal of the OR gate is then transmitted on to the counter $Z_1$.

Only the comparator output signal from the comparator $K_1$ is counted as long as only the lowest energy threshold $E_1$ of said comparator is exceeded. However, if the lower pile-up threshold of the comparator $K_3$ is also exceeded, the first comparator output signal is ignored and only the signal from the lower pile-up threshold is counted. If the upper pile-up threshold $E_4$ of the comparator $K_4$ is also exceeded, this comparator output signal is also counted.

The count-signal profile 17.1 corresponding to the OR(XOR($K_1$,$K_3$),$K_4$)-logic and belonging to this piggyback counter is illustrated in FIG. 9.

Figure 10:
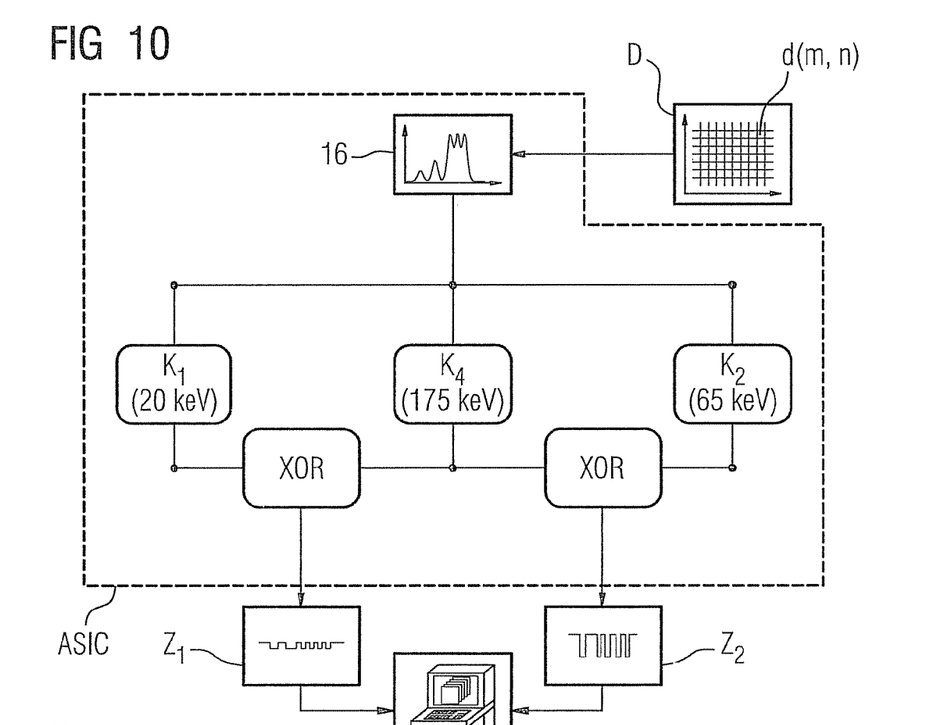
FIG. 10 shows a block diagram of a third example embodiment of a piggyback counter.
Figure 11:
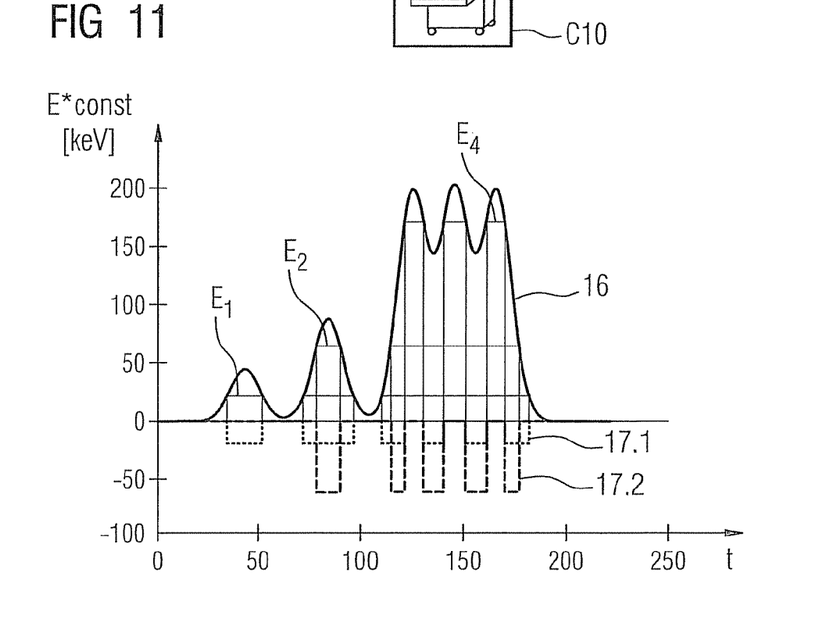
FIG. 11 shows a voltage-pulse profile as per FIG. 10.

FIG. 10 shows a block diagram of a third example embodiment of a piggyback counter with two first comparators $K_1$ and $K_2$ with energy thresholds of 20 keV and 65 keV, below the maximum energy attainable by the X-ray quanta, and with a further second comparator $K_4$ with an energy threshold at 175 keV, above the maximum energy. The comparator $K_4$ is in each case connected to the two first comparators $K_1$ and $K_2$ by means of an XOR gate, which in turn are respectively connected to a counter $Z_1$ and $Z_2$ in order to allow energy-specific registration of the X-ray quanta, especially in the region below their maximum attainable energy.

FIG. 11 illustrates the voltage profile 16 with the two count-signal profiles 17.1 and 17.2 belonging to the two counters and corresponding to the logical interconnections XOR($K_1$, $K_4$) and XOR ($K_2$, $K_4$).

Figure 12:
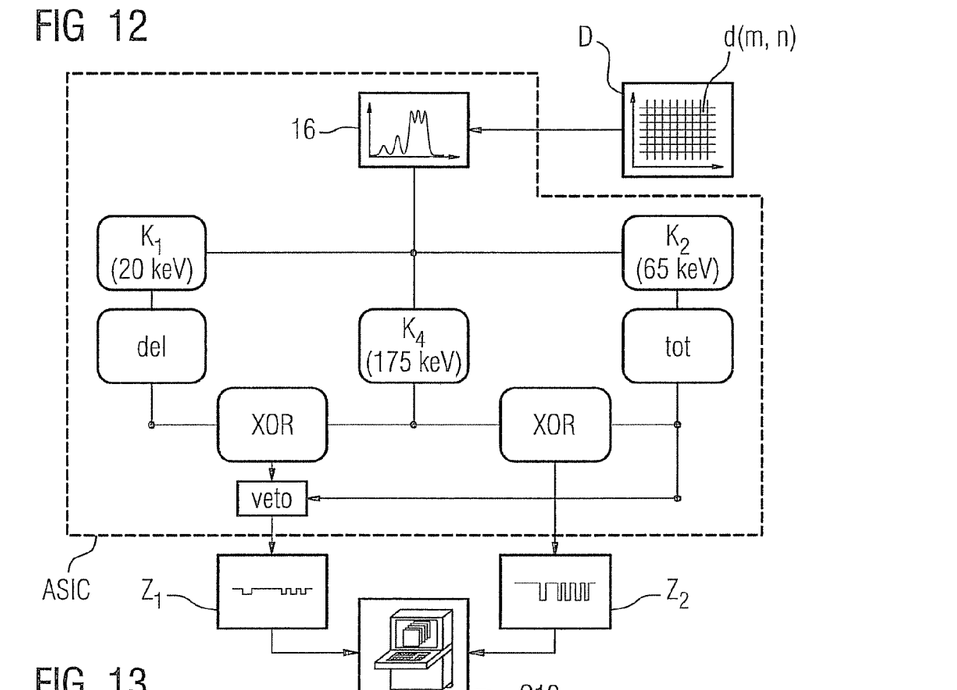
FIG. 12 shows a block ,diagram of a fourth example embodiment of a piggyback counter.
Figure 13:
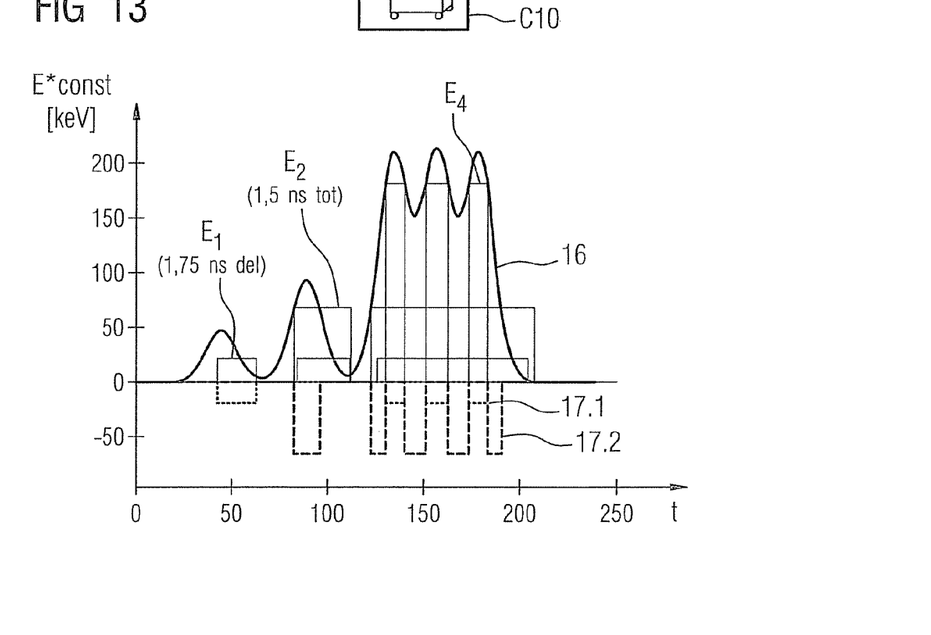
FIG. 13 shows a voltage-pulse profile as per FIG. 12.

FIGS. 12 and 13 show a fourth example embodiment of a piggyback counter. Here, the block diagram in FIG. 12 in principle shows a circuit arrangement like in FIG. 10. However, additionally a time-delay circuit del has firstly been connected between the first comparator $K_1$ and the XOR gate thereof and a dead-time circuit tot has been connected between the second comparator $K_2$ and the XOR gate thereof. Furthermore, the output of the XOR gate of the first comparator $K_1$, or the input of the first counter $Z_1$, is additionally blocked by a veto circuit veto, which is triggered by the output of the second comparator $K_2$.

FIG. 13 shows the voltage profile 16 with the two count-signal profiles 17.1 and 17.2 belonging to the two counters and with the logical interconnections XOR($K_1$,$K_4$) and XOR ($K_2$, $K_4$).

Thus, overall, at least one embodiment of the invention proposes a circuit arrangement of a quanta-counting detector with a multiplicity of detector elements, wherein the X-ray quanta registered in each detector element generate a signal profile and there is a circuit arrangement in each detector element, in which:

at least one first comparator with a first energy threshold lying in the energy range of the measured X-ray quanta and at least one second comparator with a second energy threshold lying above the energy range of the measured X-ray quanta are connected to the detector element,     the at least two comparators have a logical interconnection, wherein at least a first comparator and a second comparator are connected to the inputs of an XOR gate, and each XOR gate connected to a first comparator triggers with precisely one edge-sensitive counter.

At least one embodiment of the invention moreover relates to an application-specific integrated circuit and an emitter-detector system of an X-ray CT system, which has at least one circuit arrangement according to at least one embodiment of the invention.

It is understood that the aforementioned features of the invention can be used not only in the respectively specified combination, but also in other combinations or on their own, without departing from the scope of the invention.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combineable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, non-transitory computer readable medium and non-transitory computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a non-transitory computer readable medium and is adapted to perform any one of the aforementioned methods when run on a computer device (a device including a processor). Thus, the non-transitory storage medium or non-transitory computer readable medium, is adapted to store information and is adapted to interact with a data processing facility or computer device to execute the program of any of the above mentioned embodiments and/or to perform the method of any of the above mentioned embodiments.

The non-transitory computer readable medium or non-transitory storage medium may be a built-in medium installed inside a computer device main body or a removable non-transitory medium arranged so that it can be separated from the computer device main body. Examples of the built-in non-transitory medium include, but are not limited to, rewriteable non-volatile memories, such as ROMs and flash memories, and hard disks. Examples of the removable non-transitory medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A circuit arrangement for counting X-ray radiation X-ray quanta in detector elements in a detector in an emitter-detector system of an X-ray CT system, the X-ray radiation including a multiplicity of X-ray quanta that can have a maximum energy and wherein the X-ray quanta registered in each detector element generate a signal profile with X-ray-quanta-energy-dependent voltage pulses with different heights, which may be superposed on one another, the circuit arrangement, in each detector element, comprising:

at least one first comparator with a first energy threshold less than or equal to the maximum X-ray-quantum energy; and at least one second comparator with a second energy threshold greater than the maximum X-ray-quantum energy, the at least one first comparator and at least one second comparator being connected to the detector element, wherein the at least one first comparator and at least one second comparator each respectively generate a comparator output signal if their respective energy threshold is exceeded, the at least one first comparator and at least one second comparator including a logical interconnection, wherein at least a first comparator and a second comparator of the at least one first comparator and at least one second comparator are connected to the inputs of an XOR gate, and each XOR gate connected to the first comparator is connected to precisely one counter.

2. The circuit arrangement as claimed in claim 1, wherein at least two first comparators with different first energy thresholds are connected to the detector element and there is an XOR gate for each first comparator.

3. The circuit arrangement as claimed in claim 2, wherein there is a time-delay circuit between a first comparator and the XOR gate thereof.

4. The circuit arrangement as claimed in claim 2, wherein there is a dead-time circuit between a first comparator and the XOR gate thereof.

5. The circuit arrangement as claimed in claim 2, wherein at least one output of an XOR gate connected to a first comparator for a lower energy threshold includes a veto circuit, which, when triggered by the output from another first comparator with a higher first energy threshold, blocks the input of the counter of the first comparator with the lower energy threshold.

6. The circuit arrangement as claimed in claim 1, wherein at least two second comparators with different second energy thresholds are connected to the detector element, wherein the second comparator with the lowest energy threshold and the at least one first comparator are connected to a respective XOR gate, and there is an OR gate for each further second comparator.

7. The circuit arrangement as claimed in claim 1, wherein the at least one counter is connected to a rate correction circuit in order to correct the measured count rates of the X-ray quanta to an actual flux rate of X-ray quanta.

8. The circuit arrangement as claimed in claim 7, wherein the rate correction circuit includes a lookup table, which converts the measured count rates of the X-ray quanta to an actual flux rate of X-ray quanta.

9. The circuit arrangement as claimed in claim 7, wherein the rate correction circuit emulates a polynomial, which converts the measured count rates of the X-ray quanta to an actual flux rate of X-ray quanta.

10. The circuit arrangement as claimed in claim 1, wherein the circuit arrangement is part of an application-specific integrated circuit on a detector.

11. An application-specific integrated circuit (ASIC) for use in a detector in an emitter-detector system of a CT system with a multiplicity of detector elements, the ASIC including at least one circuit arrangement as claimed in claim 1 for each detector element.

12. The application-specific integrated circuit (ASIC) as claimed in claim 11, wherein the ASIC is connected to a plurality of detector elements.

13. An emitter-detector system of an X-ray CT system, comprising at least one circuit arrangement as claimed in claim 1.

14. The circuit arrangement as claimed in claim 3, wherein there is a dead-time circuit between a first comparator and the XOR gate thereof.

15. The circuit arrangement as claimed in claim 3, wherein at least one output of an XOR gate connected to a first comparator for a lower energy threshold includes a veto circuit, which, when triggered by the output from another first comparator with a higher first energy threshold, blocks the input of the counter of the first comparator with the lower energy threshold.

16. The circuit arrangement as claimed in claim 4, wherein at least one output of an XOR gate connected to a first comparator for a lower energy threshold includes a veto circuit, which, when triggered by the output from another first comparator with a higher first energy threshold, blocks the input of the counter of the first comparator with the lower energy threshold.

17. An application-specific integrated circuit (ASIC) for use in a detector in an emitter-detector system of a CT system with a multiplicity of detector elements, the ASIC including at least one circuit arrangement as claimed in claim 2 for each detector element.

18. The application-specific integrated circuit (ASIC) as claimed in claim 17, wherein the ASIC is connected to a plurality of detector elements.

19. An emitter-detector system of an X-ray CT system, comprising at least one circuit arrangement as claimed in claim 2.

* * * * *